Jan. 3, 1939.                    T. FISH                    2,142,639
              REVOLVING CENTER FOR LATHES AND THE LIKE
                         Filed Jan. 25, 1938
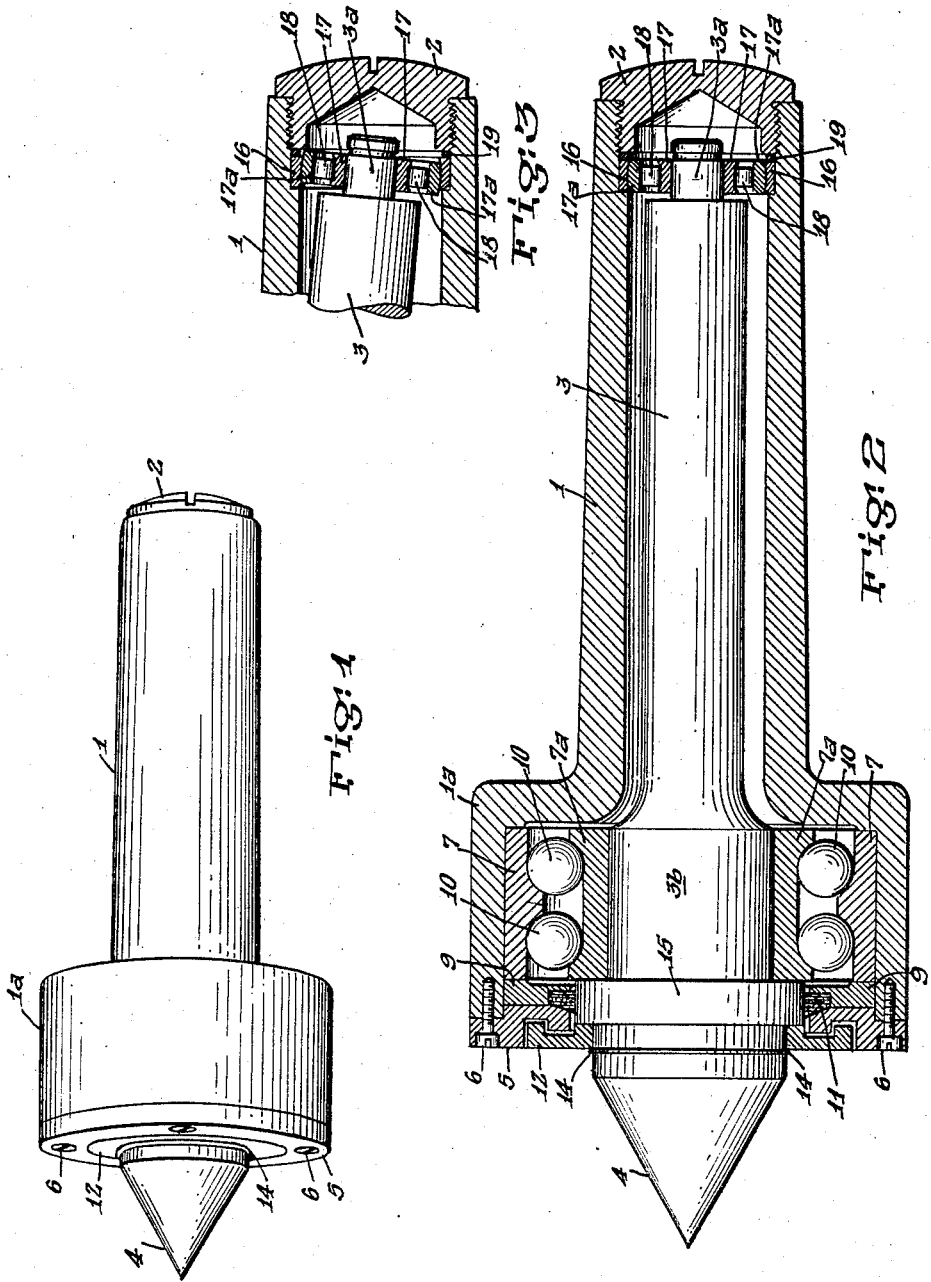
Thomas Fish  INVENTOR.
BY Mack & Blum
ATTORNEYS Patented Jan. 3, 1939

2,142,639

UNITED STATES PATENT OFFICE 2,142,639

REVOLVING CENTER FOR LATHES AND THE LIKE

Thomas Fish, Bridgeport, Conn.

Application January 25, 1938, Serial No. 186,761

4 Claims. (Cl. 82—33)

My invention relates to a new and improved revolving center for lathes, grinders, and other machine tools.

One of the objects of the invention is to provide a center having a double-row angular-contact preloaded bearing adjacent the front end of the center, and having a single-row bearing or double-row bearing at the rear end of the center. The anti-friction bearing at the rear end of the center may be preloaded or not preloaded.

The combination of the aforesaid bearings stabilizes the center and gives the center greater resistance to lateral pressure or radial pressure, namely, pressure which is perpendicular to or inclined to the longitudinal axis of the center.

Another object is to provide a center with a bearing of the preloaded type at its front end, and with a self-aligning bearing at the rear end of the center, said self-aligning bearing being a double-row ball-bearing or roller-bearing, or a single-row ball-bearing or roller-bearing. As stated previously, the bearing at the rear end of the center may or may not be preloaded.

Another object is to provide a center which is self-aligning, so that if excessive load is imposed upon the center the deflection of the shank of the center from its true position is prevented or lessened.

The improved device is also useful in preventing excessive wear on the anti-friction bearing or bearings, if the shank of the center bends or is deflected from its true position by reason of excessive load.

Other objects of my invention will be set forth in the following description and drawing which illustrate a preferred embodiment thereof, it being understood that the above statement of the objects of my invention is intended generally to explain the same without limiting it in any manner.

Fig. 1 is a perspective view of the improved device.

Fig. 2 is a section, partially in elevation, through the longitudinal axis of said device.

Fig. 3 is a sectional view of the rear end of the device, showing in greatly exaggerated form how the shank of the spindle of the device can automatically adjust itself in response to deflection.

The device has a casing 1 which is provided with an enlarged head 1a. Said casing 1 is mounted in the tail stock of a lathe or the like. Said casing 1 is closed by means of a cap 2 which is connected to the rear end of the casing 1 by means of suitable cooperating threading. The casing 1 has its inner wall provided with a shoulder against which the end wall of a retainer 16 is clamped, by means of the cap 2 and an intermediate member 19. The member 19 may be an ordinary split metal washer made of resilient metal. The retainer 16 may fit tightly against the corresponding part of the inner wall of the housing or casing 1. Said retainer 16 may have a drive fit in the casing 1, so as to prevent it from turning in the casing 1.

The inner wall of the retainer 16 has longitudinal surface elements which may be either straight or of concave shape. That is, the line of intersection between the surface of said inner wall, and every plane which passes through the central longitudinal axis of spindle 3, may be either straight or concave. Said surface elements, either straight or concave, are identical. The outer wall of the outer race 17a is correspondingly shaped, so that members 17a and 16 interfit. The inner race 17 is suitably connected to the reduced shank portion 3a, by a drive fit, or the like. Anti-friction bearings 18 are located between the races 17 and 17a in the usual manner. I have shown one row of roller-bearings, but I can use one row or more than one row of ball-bearings, of roller-bearings, etc.

Therefore, if said surface elements are rounded, the outer race 17a can turn relative to the retainer 16, in unison with inner race 17, about a point which is indicated by the inner end of the lead-line of the reference numeral 3a in Fig. 3, from the position shown in Fig. 2 to the position shown in Fig. 3. This lateral turning is greatly exaggerated in Fig. 3. If the longitudinal surface elements of the inner wall of member 16 are concave, the longitudinal surface elements of the outer wall of member 17a are convex.

The head 1a is provided with an outer race 7 which may have a tight fit therein, so that the outer race will not turn in said head. The inner race 7a is connected in the usual manner to the head 3b of the spindle 3. Anti-friction bearings 10 are located between the races 7 and 7a. These bearings are balls but any other type may be used.

As shown in Fig. 2, the balls 10 have portions of their surfaces abutting the wall of an extension of the inner wall of member 7.

Preloaded bearings per se are well-known. In making a preloaded bearing of the double-row type, one row of the balls is assembled with its retainer and with the races under no pressure, so that there is a slight play, until the second row of balls has been inserted, together with its retainers. The bearing is designed so that it has a minus tolerance for both rows of balls, so that it requires pressure to insert the last two or three balls of the second row. This is done by means of a press. The second row of balls has the usual inner and outer retainers which are connected to each other after all the balls of the second row have been inserted. A preloaded bearing of this type has considerable binding effect until the effect of the preloading has been relieved by means of a thrust which is parallel to the axis of revolution. This is the type of bearing which I use at the front end of the center.

The head 1a of the casing is provided with the usual cap 5, which is connected by means of screws 6 to the end wall of said head 1a. The metal cap 5 clamps a metal washer 9 in position. Said washer 9 is provided with packing discs 11 which abut the annular enlargement 15 of the spindle 3. A sealing washer 12, made of metal, is located between the annular enlargements 14 and 15 of the spindle 3. The spindle 3 is provided with a head 4 of any suitable shape.

The interior of the casing 1 may be filled with any suitable lubricant which is prevented from leaking out of said casing by means of the packing washers 11, the cap 2, and the members 5 and 9. When cap 5 is clamped in position, its tapered wall-portion thrust the edges of discs 11 against members 9 and 15.

When the device is used, the load is usually inclined to the axis of revolution of spindle 3, so that said load has a component which is parallel to the axis, and a component which is perpendicular to the axis. The parallel component relieves the binding effect of the preloading of the bearing at the front end of the spindle. The other component tends to deflect the spindle from its true position, which is shown in Fig. 2.

This deflection is resisted by the preloaded double-row bearing at the front end of the spindle, and also by the bearing at the rear end of this spindle. This radial load will cause the spindle to deflect slightly between the bearing at the front end and the bearing at the rear end, so that the spindle is no longer truly straight. This deflection is accommodated by the design of the bearing which is shown in Fig. 3, thus preventing said bearing from binding and becoming excessively heated. The design of the bearing at the rear end may be varied from the specific example given, in order to make the center self-aligning.

However, I do not wish to be limited to a rear bearing of the preferred type, because the combination of a preloaded double-row angular-contact bearing at the front end, with a single row or double row anti-friction bearing of any type at the rear end, is included in the invention.

I do not wish to be limited to the specific shape of the retainer 16 specified herein, although this is preferable. The invention generally covers every type of bearing in which the spindle is self-aligning.

I have shown a preferred embodiment of my invention, but it is clear that numerous changes and omissions can be made without departing from its spirit.

While the invention is particularly useful in connection with a revolving center, it is also applicable to other uses so that the invention is not to be restricted to the specific purpose or in the specific device which is stated in the description or in the claims.

The common center point of the concave longitudinal surface elements of the inner wall of the retainer 16 may be defined as the intersection between the axis of revolution of the member 3, and a plane which is perpendicular to said axis and which passes through the median line of the retainer 16. Said median line is a circle which is equally spaced from the front end and from the rear end of said retainer 16.

While I have referred to the member 16 as a retainer, said member 16 in effect serves as a bearing for the outer wall of the outer race 17a, so as to permit relative movement between said members 17a and 16 when the spindle is deflected from its true position.

When the spindle is deflected from its true position, the bearing for said spindle moves relative to the casing in what may be designated as a lateral direction, since said direction is lateral to a plane which is perpendicular to the axis of revolution of the spindle.

I claim:—

1. A revolving center comprising a casing, a turnable spindle located in said casing and having its front end portion projecting from said casing, a double-row angular-contact preloaded anti-friction bearing located in the front of the casing and between said casing and the adjacent front portion of the spindle, and an additional anti-friction bearing located in the casing and between the casing and the spindle, said additional bearing being spaced rearwardly from said double-row bearing.

2. A revolving center comprising a casing, a turnable spindle located in said casing and having its front end-portion projecting from said casing, a double-row angular-contact preloaded anti-friction bearing located in the front of the casing and between said casing and the adjacent front portion of the spindle, and an additional anti-friction bearing located in the casing and between the casing and the spindle, said additional bearing being spaced rearwardly from said double-row bearing, the additional bearing being shaped to move laterally relative to the casing when the spindle is deflected from its true position.

3. A revolving center comprising a casing, a turnable spindle located in said casing and having its front end-portion projecting from said casing, bearing means located in the front-portion of the casing between the inner wall of the casing and the adjacent front-portion of the spindle, and an additional anti-friction bearing located in the casing between the inner wall of the casing and the spindle, said anti-friction bearing being spaced rearwardly from said bearing means, said anti-friction bearing being shaped to move laterally relative to the casing when the spindle is deflected from its true position.

4. A revolving center comprising a casing, a turnable spindle located in said casing and having its front end-portion projecting from said casing, bearing means located in the front-portion of the casing between the inner wall of the casing and the adjacent front-portion of the spindle, and an additional anti-friction bearing located in the casing between the inner wall of the casing and the spindle, said anti-friction bearing being spaced rearwardly from said bearing means, said anti-friction bearing being shaped to turn relative to the casing about a point which is located substantially on the axis of revolution of the spindle.

THOMAS FISH.